United States Patent
Peng

(10) Patent No.: US 9,505,999 B1
(45) Date of Patent: Nov. 29, 2016

(54) METHOD TO REDUCE FORMATION OF EFFLUENT WATER IN THE COAL GASIFICATION PROCESS

(71) Applicant: Wanwang Peng, Birmingham, AL (US)

(72) Inventor: Wanwang Peng, Birmingham, AL (US)

(73) Assignee: Wanwang Peng, Birmingham, AL (US)

( * ) Notice: Subject to any disclaimer, the term of this patent is extended or adjusted under 35 U.S.C. 154(b) by 0 days.

(21) Appl. No.: 14/738,859

(22) Filed: Jun. 13, 2015

(30) Foreign Application Priority Data

May 26, 2015 (CN) .......................... 2015 1 0273366

(51) Int. Cl.
  *C01B 3/36* (2006.01)
  *C10K 3/04* (2006.01)
  *C10K 1/02* (2006.01)
  *C10K 1/08* (2006.01)
  *C10K 1/04* (2006.01)
  *C10J 3/84* (2006.01)

(52) U.S. Cl.
  CPC .. *C10K 3/04* (2013.01); *C10J 3/84* (2013.01); *C10K 1/02* (2013.01); *C10K 1/04* (2013.01); *C10K 1/08* (2013.01); *C10J 2300/093* (2013.01); *C10J 2300/0976* (2013.01); *C10J 2300/1807* (2013.01); *C10J 2300/1853* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 4,678,860 A | * | 7/1987 | Kuester | C07C 1/0435 518/704 |
| 4,971,683 A | * | 11/1990 | Meyer | C10L 1/32 208/431 |
| 5,132,007 A | * | 7/1992 | Meyer | C10G 1/002 208/427 |
| 7,883,556 B1 | * | 2/2011 | Wintrell | C10J 3/08 48/197 FM |
| 2007/0256360 A1 | * | 11/2007 | Kindig | C10J 3/57 48/197 A |
| 2008/0147241 A1 | * | 6/2008 | Tsangaris | C10J 3/00 700/273 |
| 2008/0202028 A1 | * | 8/2008 | Tsangaris | C10J 3/005 48/73 |
| 2009/0031615 A1 | * | 2/2009 | Joshi | C10G 2/32 44/307 |
| 2010/0121125 A1 | * | 5/2010 | Hippo | B01J 21/18 585/733 |
| 2013/0167441 A1 | * | 7/2013 | Sevastyanov | C10L 1/326 48/210 |
| 2014/0117287 A1 | * | 5/2014 | Ariyapadi | B01J 7/00 252/373 |
| 2015/0376801 A1 | * | 12/2015 | Bairamijamal | B01D 53/002 204/257 |
| 2016/0045841 A1 | * | 2/2016 | Kaplan | B01J 19/0093 429/49 |

* cited by examiner

*Primary Examiner* — Imran Akram

(57) ABSTRACT

A method to reduce formation of waste water in coal gasification and syngas pretreatment process by increasing the salinity of the waste water thereby reducing the overall volume of waste water formed.

9 Claims, 1 Drawing Sheet

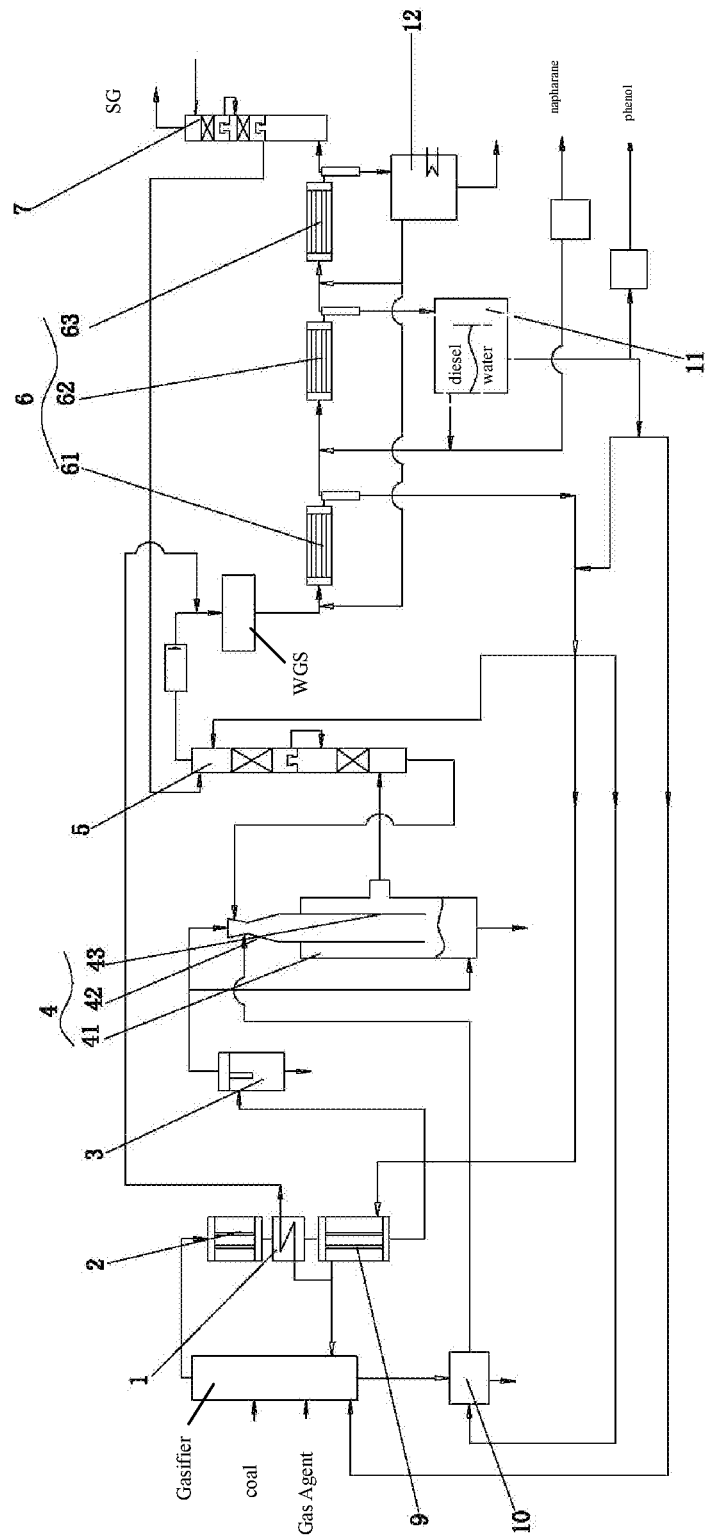

METHOD TO REDUCE FORMATION OF EFFLUENT WATER IN THE COAL GASIFICATION PROCESS

FIELD OF THE INVENTION

The invention relates to a field of syngas production technology. Specifically, a method to reduce the quantity of waste water generated in the coal gasification and syngas pretreatment process, by optimization of water utilization within a production system to reach a nearly zero waste water effluent discharge over syngas production.

BACKGROUND OF THE INVENTION

Modern large-scale coal gasification technology is applied in chemical synthesis raw gas production, synthetic natural gas production and integrated gasification combined cycle (IGCC) power generation. However people are forced to ignore potential or existing environmental pollution caused by this process as reducing power output would be in conflict with the pursuit of economic development. Nearly all effluent discharged by coal gasification processes is harmful to the environment to different degrees. If proper water treatment on the effluent is not carried out, the impact on the environment is immediate and also long term. The purpose of economic development is to improve living conditions, yet damage to the environment will directly or indirectly destroy our living, but the sufferer of environmental destruction is not always the beneficiary of economic development. Due to the abundance of water, normally the beneficiary of economic development is not the sufferer of the waste effluent. This might be the one of important reasons that why economic development cannot harmonious coexistence with environment. Based on the harmonious requirements of national, local economic development and improvement of people's livelihood, the current ineffective coal gasification waste effluent control needs to be improved. The severe environmental pollution problems caused by coal gasification effluent needs to be solved.

Currently, treatment on effluent discharged by coal gasification is basically passive, for example the water treatment will be only carried out after the waste water been generated and discharged from the main production process. As the waste effluent has already been formed and discharged, any after treatment process is ineffective to remove pollutants. At the same time, there will be a certain parts of the waste effluent that could be recyclable resourced, therefore direct discharge of the waste water is a waste of resources.

Accordingly, there is a need for an improved method for waste water purification in the coal gasification process.

SUMMARY OF THE INVENTION

The invention provides a method to reduce formation of effluent water during the coal gasification process. Based on the features of coal gasification and syngas pre-purification, to efficiently reduce the production of waste water by integrating each related water and steam aspect, and recycling the condensate water generated in production process.

The method to reduce the amount of effluent water discharged in the coal gasification production process comprises the steps described below:

transferring the syngas from the gasifier to a cooler for cooling, then transferring the cooled syngas to a filter for dedusting.

transferring the cooled and dedusted syngas to the concentrator.

transferring the syngas from the concentrator to a scrubber to remove the impurities in syngas. The impurities including inorganic salts and residual dust, which is transferred to washing water to form salt-contained water.

transfer the salt-contained water from the scrubber to the concentrator. The salt-contained water contacts with the syngas from gasifier, and some of the salt-contained water is evaporated by heat carried by the syngas, and so strongly increases the salt concentration or molarity of the water.

transfer the residual higher molarity salt water out of the concentrator, and mix the vapor generated during its evaporation with syngas.

superheating the syngas out from the scrubber and then the superheated syngas is transferred to the catalytic shift reactor for water-gas shift reaction.

Syngas from the catalytic shift reactor needs to be cooled in stages. Over 2 cooling stages, syngas will be cooled in a first cooling stage, and then transferred to the second cooling state wherein the cooling temperature is lower than the first stage. The water condensed in the first cooling stage will be send to the scrubber as circulation washing water, and the condensed water generated in the second cooling stage will be send back to the second cooling stage as cooling water.

The cooled syngas will be transferred to an ammonia washing tower. Fresh demineralized water is used for ammonia washing, washing water from the ammonia washing tower will be send back to the scrubber downstream of concentrator. Syngas from the ammonia washing tower will be transferred to the purification system for purifying treatment.

The said concentrator comprises a gas-liquid contact evaporation tube, a gas-liquid separator and liquid collection barrel. The gas-liquid contact evaporation tube is set at the inlet of the gas-liquid separator, and the gas-liquid separator is installed in the liquid collection barrel. Both the syngas and salt-contained water are fed in through the gas-liquid evaporation tube, and then move into the gas-liquid separator for separation. The separated gas will be discharge to the scrubber, and the separated liquid will be collected in the liquid collection barrel.

Part of the warm syngas from the deduster will be send to the bottom of the concentrator liquid collection barrel. The syngas evaporates liquid at the bottom of the collection barrel to further increase the concentration of the residual liquid. The liquid will then be discharged from bottom of the collection barrel.

The said staged cooling is a three-level cooling, including first stage, second stage and the third stage. The outlet temperature of the first stage cooling is about 95° C.~110° C., and the condensed water will be sent to the scrubber as washing water. The outlet temperature of the second stage cooling is about 60° C.~80° C. and the outlet temperature of the third stage cooling is about 25° C.~50° C. Syngas will be successively sent to the 1st, 2nd, and 3rd cooling stage. Syngas out of the 3rd cooling stage will be sending to the ammonia washing tower.

In the third cooling stage, ammonia in syngas will shift into the condensates, and will then react with carbon dioxide and water in syngas to generate ammonium bicarbonate. Condensates generated in the third cooling stage will be discharged for further deep cooling to precipitate out the ammonium bicarbonate. The precipitated solid ammonium bicarbonate will be recovered as byproduct, and the residual lean condensates will be send back to the first and third cooling stage as recycle cooling water.

The cooling stages further comprises a step whereby diesel can be fed to the second cooling stage. Diesel will mix with the syngas in the second cooling stage. Diesel extracts the macromolecular organic compounds in syngas. Mixtures of diesel and condensations out from second cooling stage are separated and parts of the diesel are returned to the second cooling stage for cyclic utilization, and the other parts of the diesel are transferred to the organic recovery unit for organic recovery. Parts of the condensation will be discharged out for phenol recovery, transferring part of condensate to third stage cooler inlet, and the other part are transferred back to the scrubber and gasifier.

More detail aspects of the cooling stages:

After syngas has been cooled down in the cooler, and before dedusting, the cooling syngas can be transferred to the syngas-condensate-steam superheater for superheating, then to the syngas-condensate-evaporator. Syngas out from condensate evaporator can then be transferred to the deduster for dedusting.

Parts of the condensate generated in the first and second cooling stage can be transferred to the syngas-condensate-evaporator.

Parts of the steam generated in the condensate evaporator are transferred to the gasifier for gasification reaction, and the other parts will be superheated in the syngas-condensate-steam superheater and then transferred to the syngas stream at the inlet of catalytic shift reactor.

Further detail of the cooling stages:

Slag water discharged by the gasifier will be drawn into the slag water collecting tank. Parts of the condensate from the syngas cooling stage can be transferred to this slag water collecting tank as slag water make-up water. Portion of the slag water can be transferred for filtering treatment and then transferred to the gas-liquid contact evaporating tube of concentrator to mix with the syngas therein. The slag water will be concentrated in solids and salt content.

The amount of discharged salt-contained water can be greatly reduced by using the sensible heat of syngas to concentrate the syngas scrubbing salt-contained water and gasifier slag water. Diesel is circulated to absorb those low concentration large molecular organics in syngas to avoid the operation problems caused by organic crystallization, and recover the organic byproducts at the same time. Increasing the ammonia concentration by recycling low temperature syngas condensate, can be achieved by promoting the formation of ammonium bicarbonate, and recovering the ammonium bicarbonate byproducts by deep cooling crystallization. An ammonia washing tower employs demineralized water for syngas ammonia washing. The used washing water will be collected and can be transferred to the syngas scrubber as the last stage of make-up water for scrubbing. Syngas condensate will be recycled in the process, and parts of the syngas condensate will be heated and evaporated to generate high pressure superheated steam which can be used as steam by the normal gasifier process and water-gas shift reaction, this very efficiently reduces the generation of waste water from the main syngas production and pretreatment process.

While maintaining all process function of each unit (Dedusting, Demineralization, Macromolecule Organics Absorbing and Ammonia Recovery) the invention achieves integrates water loop configuration and optimizes the water balance in the process system and so significantly reduces the generation and collection of waste water in the whole coal gasification process, and finally reach a target of nearly zero generation and discharge of liquid effluent. The invention is applicable to a variety of pressurized fluidized bed (transport bed) gasification, entrained flow gasification and some of fixed bed gasification system.

BRIEF DESCRIPTION OF THE DRAWINGS

The accompanying drawing(s), which are incorporated in and constitute a part of this specification, illustrate several aspects described below.

FIG. 1 is a schematic diagram of the invention pipe connection.

DETAILED DESCRIPTION OF THE PREFERRED EMBODIMENTS

It is to be understood that this invention is not limited to particular embodiments described, as such may, of course, vary. It is also to be understood that the terminology used herein is for the purpose of describing particular embodiments only, and is not intended to be limiting, since the scope of this invention will be limited only by the appended claims.

The detailed description of the invention is divided into various sections only for the reader's convenience and disclosure found in any section may be combined with that in another section. Unless defined otherwise, all technical and scientific terms used herein have the same meaning as commonly understood by one of ordinary skill in the art to which this invention belongs.

It must be noted that as used herein and in the appended claims, the singular forms "a", "an", and "the" include plural referents unless the context clearly dictates otherwise. Thus, for example, reference to "a compound" includes a plurality of compounds.

I. DEFINITIONS

Unless defined otherwise, all technical and scientific terms used herein have the same meaning as commonly understood by one of ordinary skill in the art to which this invention belongs. As used herein the following terms have the following meanings.

The term "about" when used before a numerical designation, e.g., temperature, time, amount, concentration, and such other, including a range, indicates approximations which may vary by (+) or (−) 10%, 5% or 1%, or any subrange or subvalue there between.

"Comprising" or "comprises" is intended to mean that the compositions and methods include the recited elements, but not excluding others. "Consisting essentially of" when used to define compositions and methods, shall mean excluding other elements of any essentially significance to the combination for the stated purpose. Thus, a device or method consisting essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are within the scope of this To facilitate the understanding of the skilled person in this area, we provide a description to be used combined with FIG. 1.

The invention discloses a method to reduce the formation of effluent discharge in the coal gasification syngas production process. By recycling and recovery treatments, this invention achieved demineralization, macromolecular organics absorption and ammonia recovery, and reduced the waste water discharge as well.

Therefore, the invention is implemented by the method below:

A method to reduce formation of effluent water discharge in coal gasification production process, comprising the steps below:

S1, Send the syngas out from gasifier to the initial cooler for cooling, and then send to the deduster for dedusting (normally high temperature dry dust removal). As syngas cooling and dedusting is very common in this field, no further details will be stated here. Feed coal and the related gasification agent (normally air or oxygen) into the gasifier together. The moisture contained in the coal will be evaporated to water vapor due to the high temperature in the gasifier, and a small portion of the hydrogen and oxygen in the coal will chemically react to generate water vapor. Normally a certain amount of steam will be fed into the gasifier accompanied with the gasification agent (air or oxygen), the steam is working as gasification reactant, and as well as gasifier temperature conditioning agent. Parts of the steam will be consumed by the gasification reaction in the gasifier, residual steam mixes with the raw syngas and exits the gasifier. Generally superheated steam will be required for the gasifier, and the degree of superheating is basically need to ensure that no condensation occurs when steam mixes with oxygen. In addition, the purity of the steam fed into the gasifier is not the main problem. A certain amount of organic matter in the steam can be acceptable, because all reaction gases including oxygen and steam will all experience the high temperature of the gasifier, and the organic materials will be converted during the high temperature reaction. Different from the regular coal gasfication process, the steam generated from evaporating syngas condensate can meet above requirements, which provides the opportunity for the utilization of the syngas condensate.

S2, Send the cooled and dedusted syngas to concentrator. The concentrator includes a gas-liquid contact evaporation tube 42, gas-liquid separator 43 and liquid collection barrel 41. The gas-liquid contact evaporation tube is set at the inlet of the gas-liquid separator, and the gas-liquid separator is installed in the liquid collection barrel. Both the syngas and salt-contained water are fed in through the gas-liquid evaporation tube, and then pass into the gas-liquid separator for separation. Separated gas is discharged to the scrubber, and the separated liquid will be collected in the liquid collection barrel.

S3, Syngas from the concentrator is transferred to the scrubber for scrubbing. The washing water supply from the ammonia washer to the scrubber has essentially no salinity. The washing water will remove the impurities contained in syngas, including inorganic substance saline materials, halogenated compounds & residual dust, and also organics generated under the scrubber operating temperature. These impurities are transferred into the washing water and form salt-contained water. At the same time, most of the washing water in contact with the high temperature syngas in the scrubber will be evaporated into steam by the heat of the syngas. The steam mixed with syngas thus increased the steam content in the syngas, which is required in the downstream catalytic shift reactor. Therefore the scrubbing water been effectively used. Normally syngas exiting out from the scrubber is in steam saturation condition. Salt-contained water with a certain concentration will be discharged at bottom of the scrubber, and it includes nearly all soluble inorganic impurities in the syngas.

S4, The salt-containing water from bottom of the scrubber is transferred to the concentrator. The salt-containing water contact with the warm syngas from gasifier, and most of the salt-contained water been evaporated by sensible heat carried by syngas, the residual salinity stays in the unevaporated part and so strongly increases the brinishness of the said water In addition, some of the syngas from the deduster can is transferred to the bottom of the liquid collection barrel. The syngas will evaporates the liquid at the bottom of the collection barrel to further increase the brinishness of the residual liquid. The said liquid with increased brinishness is discharged from bottom of the collection barrel. As the salinity concentration of the discharged salt-contained water is very high the discharged quantity is very low. The discharged high concentration salt-contained water is transferred to the related unit to reduce the concentration further, following this the low concentration salt-contained water is transferred back to the concentrator for recycle utilization. The concentrated salt-contained water may be transferred to a specially designed high temperature zone of the gasifier, the saline matter is agglomerated under the high temperature and then discharged as slag which will also minimize or avoid the discharge of salt-containing water. Most of the water that enters the concentrator will be evaporated to steam by contact with high temperature syngas. The steam will mixed with syngas and the steam content in the syngas will increase, and when this mixture enters the scrubber, the steam remains mixed with the syngas.

S5, the impurity content of the scrubbed syngas in the scrubber is extremely low. The syngas is superheated out from scrubber to ensure the steam contained in syngas is also superheated, the superheated syngas is transferred to a catalytic shift reactor for shift reaction. As the steam in the syngas is superheated, there is no potential impact of condensation on the catalyst.

In the catalytic shift reactor, carbon monoxide reacts with water to produce hydrogen and carbon dioxide. The main purpose of this shift reaction is to regulate the molar concentration ratio of carbon monoxide/hydrogen in the syngas out of the reactor to meet downstream system requirements on syngas compositions concentration ratio. Normally, we regulate the ratio of water and carbon monoxide by controlling the steam flow at the inlet of the catalytic shift reactor, and at the same time, we control the reactor temperature by removing the reacting bed heat (catalytic reaction is an exothermic reaction), and finally we control the carbon monoxide conversion rate and the ratio of carbon monoxide and hydrogen. Besides temperature control, steam content of the syngas at the inlet of catalytic shift reactor is also an important control parameter. Normally the molar ratio of water and carbon monoxide is in a range of 1.5~3. In syngas, conversion of a portion of carbon monoxide will consume the equal portion of water. When syngas reaches the outlet of the reactor, steam of an equivalent molar amount to the carbon monoxide converted will be consumed, and the residual steam will go to the downstream cooling system together with the shifted syngas. When the syngas-steam mixture goes through the catalytic shift reactor, parts of the steam in syngas will be consumed, and the other parts will continue to mix in the syngas.

Furthermore, the source of the steam in the syngas (at the inlet of catalytic shift reactor) includes the self-contained steam in syngas from the scrubber and the additional supplied superheated steam. The amount of additional supplied steam can be adjusted according to the steam content from scrubber. If the steam contained in the syngas from scrubber is enough, no extra steam needs to be added. In a conventional process the shift reaction itself has a relatively high requirement on the purity of steam, but basically needs to ensure no inorganic impurities which may cause catalyst poisoning and deactivation, and macromolecular organic impurities which may block catalyst pores. Different from the regular coal gasification processes, the steam generated from the syngas-condensate-evaporator and superheater with preliminary treatment satisfies the above requirements, which offers opportunity for use of the recycled syngas condensate downstream.

S6, Syngas out of the catalytic shift reactor needs to be cooled in stages. Preferably at least 2 cooling stages. Syngas is cooled in the first cooling stage, and then transferred to the second cooling stage wherein the cooling temperature is lower than the first stage. The condensate water generated in the first cooling stage will be transferred to the scrubber as washing water, and the condensate water generated in the last cooling stage is transferred back to the related cooling stage as cooling water. In cooling process, the temperature of syngas will be reduced successively in each stage. In further detail, if the syngas temperature at the outlet of first cooling stage is K, and the temperature at the outlet of the second stage is J, J is lower than K; if the temperature at the outlet of cooling stage is L, in that way, L is lower than J, the rest can be done in the same manner.

The cooling process can be set as a 3, 4 stages or other numbers of cooling stages. This can be flexibly chosen based on the actual situation. Condensate from the cooling stage has nearly no salinity, so is suitable for syngas scrubbing.

In this example, a three-level cooling is employed. As stated above, condensations at different temperature will occur in different stages. The temperature of the condensation in the first stage is the highest; temperature of the condensation in the second stage is lower the first stage, and temperature of the condensation in the third stage is lower than the second stage. The syngas temperature will go lower and lower. Many publicly known heat exchangers and coolers can achieve this stage cooling, so no more details will be stated here.

In this example; we have set three-level cooling which including first cooling stage, second cooling stage and the third cooling stage. The outlet temperature of the first cooling stage is 95° C.~110° C., and the condensation water will be send to the scrubber as washing water; The outlet temperature of the second cooling stage is about 60° C.~80° C., and the outlet temperature of the third cooling stage is about 25° C.~50° C. Syngas will be successively send to the 1st, 2ed, and 3rd cooling stage.

In syngas staged cooling, different impurities in syngas can be preliminarily concentrated and separated in different stages. The temperature of the syngas cooled down from the first cooling stage is about 95° C.~110° C., most of the steam in syngas has been condensed. At this time, as the heat exchanger is still at a relatively high temperature, the condensate formed in first stage contains very little condensable organic, and ammonia has a very low solubility in water, therefore the condensate formed in first cooling stage can be directly recycled to scrubber as washing water. After the second stage cooling, the temperature of syngas has been reduced to about 60° C.~80° C. At this temperature range, most of the organic impurities in syngas will be condensed or solidified. Some of those impurities dissolve in water, some of them will not. For example, naphthalene will seed out. Some of the phenol organics are water soluble at a relatively high temperature, so in this cooling stage, phenol will condense and mostly dissolve in the condensate water. Under this situation, we can recover those seed out byproducts like phenol, naphthalene, anthracene, phenanthrene etc. When syngas is at a lower temperature, after the third stage cooling, the syngas temperature has reduced to about 25° C.~50° C., ammonia in syngas be more soluble in water, at this time, the condensate is enriched with ammonia from syngas, which facilitated the recovery of ammonia.

Based on the temperature staged cooling, impurities in syngas will enrich in the condensation in different stages, this will facilitate further water treatment, and has also reduced the amount of water containing various impurities in each stage.

S7, syngas from the staged cooler is transferred to an ammonia washing tower to remove all the residual ammonia. Used washing water from the ammonia washing tower will be send to the scrubber.

S8, syngas from the ammonia washing tower is transferred to a related purification system for purification.

Furthermore, more detail steps in the cooling stages:

S9, syngas will be continue to be cooled down and form condensate in the third cooling stage. Ammonia in syngas will transfer into the condensate. In the low temperature, ammonia in the condensate will react with carbon dioxide in syngas and water, to form ammonium bicarbonate. The condensate is discharged as ammonium carbonate solution formed in the third cooling stage which is further cooled down to crystalize out solid ammonia bicarbonate, the solid is separated and recovered. The residual solution with low ammonia concentration can be send back to the first and third cooling stage. Part of the low concentration solution is transferred back to the inlet of first stage for further recovery of the remaining ammonium bicarbonate. The other part of dilute ammonia bicarbonate solution is transferred to the syngas stream at the inlet or outlet of the first stage cooler. At relatively higher temperature, ammonia will be released out again and mixed with syngas towards the second stage cooling, while water will be discharged out together with this stage condensate.

During the process of syngas cooling and condensation formation, the gaseous ammonia in syngas also gradually dissolves in the condensate. The lower the temperature is, the more ammonia dissolves in condensation, and less ammonia is left in the syngas. When syngas and the condensation are in a relatively low temperature conditions, ammonia in the condensation will react with carbon dioxide and water to form ammonium bicarbonate. The solubility of ammonium bicarbonate in water increases at higher temperature, likewise solubility becomes lower at lower temperature. After the third stage cooling, the temperature of syngas and the condensation is lower, normally about 40° C. This temperature is in favor of the formation of ammonium bicarbonate. Parts of the condensate are transferred as solution which contains ammonium bicarbonate to be further cooled down. It can be send to a cryogenic crystallizer to cool and seed out the ammonium bicarbonate. The solid ammonium bicarbonate is precipitated and separated from the liquid. This achieves the recovery of ammonia from coal gasification.

Further details of the cooling stages:

S10, feed diesel to the second cooling stage. Diesel will mix with the syngas in the second cooling stage. Diesel removes macromolecular organics in syngas by absorption. The diesel and condensation mixture from the second cooling stage is separated, part of the diesel is sent back to the second cooling stage for cyclic utilization, other parts of the diesel are sent to the organic recovery unit for organic recovery. Parts of the condensation will be discharged out for phenol recovery, and the other part are sent back to the scrubber and gasifier. A collection tank is provided to collect the diesel and condensation discharged from the second cooling stage. Diesel is suspended at the top and the condensation sinks to the lower part due to difference in density. Most of the diesel is recycled back to the second cooling stage, and a small portion of the diesel is sent to the organic recycling unit for organic recovery. The organics normally comprise naphthalene, anthracene, phenanthrene etc. Part of the separated condensation is sent to the scrubber as washing water, a small portion of the condensation is sent to a separate specially designed high temperature zone of gasifier. This can reduce the content of organic impurities in the recycling condensation and phenol in parts of the separated condensations is recovered by cooling or extraction.

Diesel or other solvent is added to dissolve those macromolecular organics condensed from syngas but does not dissolve in water, this prevents crystallization on cooling surface and to ensure a long term stable operation. Part of the diesel use for organic recovery, and most of the diesel will be recycled. For phenol dissolved in water, part of the condensations can be removed, and the phenol can be recovered by cooling to achieve crystalization or by extraction. After separating with diesel and extracting out the phenol, the condensation has nearly no salinity, and only contained some organic matter. It can be send back to the scrubber for syngas washing to achieve the recycling the condensation. As some ammonia starts dissolving into condensate, part of condensate is sent to third stage cooler inlet. A small part of the condensation is sent back to the high temperature zone of the gasifier, which is in favor of reducing the content of impurities in the circulation liquid.

In accordance with the specific circumstance of organics contained in the syngas, it is possible to send the circulation diesel to the inlets of the scrubber, first cooler or third cooler. A diesel-water separator is provided in each cooling outlet, the diesel is separated and collected diesel by continuous circulation, and the condensations is separated from each stage can also continue each individual circulation.

Additionally, this method may also include stage 11:

After syngas has been cooled down from the cooler, and before the dedusting, the cooling syngas can be sent through the syngas-condensate-steam superheater, and the syngas-condensate-evaporator. Syngas from the syngas-condensate-evaporator can then be sent to the deduster for dedusting. Parts of the condensate generated in the first and second cooling stage are sent to the syngas-condensate-evaporator. Parts of the syngas-condensate-steam generated in the syngas-condensate-evaporator can be sent to gasifier for gasification reaction, and the other parts can be superheated in the syngas-condensate-steam superheater and then sent to the syngas stream at the inlet of catalytic shift reactor.

Compared to other normal heat exchanging boilers which need demineralized and deaerated water to generate steam, the syngas-condensate-evaporator will handle syngas condensate which basically has no salinity but contains a certain amount of organics, ammonia, and some sulfur components. These organics and ammonia impurities have no obvious impact on the evaporation of water, and also nearly have no impact on the safe operation of the evaporator. But for conservative reasons, the structure design and material selection of the syngas-condensate-evaporator should be carefully considered. One of the main features is that operation pressure of the syngas-condensate-evaporator is only slightly higher than the gasifier, because the steam is used is the gasifier or the shift reactor. There is no requirement to operate at very high pressure.

Moreover, for a gasifier which forms slag; the slag water needs to be discharged. In step 13. Slag water discharged from gasifier can be drawn into the slag water collecting tank. Parts of the condensate from the cooling stages can be sent to this slag water collecting tank as slag water make-up water. Parts of the slag water are filtered and then sent to the gas-liquid contact evaporating tube of the concentrator to mix with warm syngas there. The slag water will be concentrated as solid or as salts. Most of the slag water in this slag water tank can be recycled for slag treatment, thus reducing the slag water discharge.

It is understood that the cooler, deduster, heat exchanger, gasifier, ammonia washer tower, ammonia stripper, superheater, evaporator, catalytic shift reactor stated above are all mature modern technology, so no more details are stated here.

The invention includes the recovery of ammonia in the condensate generated in coal gasification processes, removing and recovery of big molecule organics in syngas, enrich condensation salinity content concentration, and minimize discharging of salt-contained water. Furthermore, it provides a process to evaporate the condensation to generate steam to satisfy the process requirement on steam for the gasifier and catalytic reactor, and utilized the features of steam consumption in coal gasification process and water-gas shift reaction to achieve a purpose of effluent water formation and reduction in discharging during the whole gasification and syngas pretreatment process.

FIG. 1 Schematic Diagram of the Invention Pipe Connection of the Present Invention.

This unit includes the initial cooler 2 connected with the gasifier, and the following equipment connected successively by pipelines: syngas-condensate-steam superheater 1, syngas-condensate-evaporator 9, dry duster 3, concentrator 4, scrubber 5, superheater, catalytic shift reactor, staged cooling system 6 and ammonia washing tower 7 (ammonia washing tower 7 connect with scrubber 5 by pipeline). In this case, staged cooling system contains the successively connected first stage cooler 61, second stage cooler 62 and the third stage cooler 63. The first stage cooler 61 is connected to the catalytic shift reactor by pipelines.

Syngas exits the gasifier, is cooled down by anninitial cooler, transits through the deduster, transits through the concentrator, and is transferred into the scrubber to remove impurities (dusts and organic salts including halogen). Syngas from the scrubber will be superheated, and then transferred to the catalytic shift reactor. In the reactor, a shift reaction is performed to adjust the mole concentration ratio of carbon monoxide and hydrogen to meet the downstream requirements of the process. The syngas is then transferred out from the reactor to the staged cooling system, and then the cooled syngas is transferred to the ammonia washer tower to remove the remaining ammonia. finally the syngas is transferred to the purification system.

A diesel-liquid separation tank 11 is provided at the outlet of the second stage cooler 62. Diesel and liquid mixtures exit from the second stage cooler 62 into the separation tank. In the diesel-liquid separation tank, diesel is suspended at the top, and the condensate water sinks to the bottom. Most of the diesel suspend in the top can be recycled to the second stage cooler, and organic molecules (e.g. naphthalene, anthracene, phenanthrene etc.) are recovered from a small part of the diesel. Condensation in the bottom of the tank is also recycled. The bottom of the separation tank will connect to a gasifier, slag water unit, condensate evaporator and scrubber by pipelines.

Condensate discharged from the third stage cooler is sent to the deep cooling crystallizer 12 for further cooling. This crystallizer is connected to the inlet of the first and third stage cooler by pipelines.

In addition, a slag water unit 10 is provided at the bottom of gasifier to collect the discharged slag water. After exiting the filtering treatment, the slag water will be sent to the concentrator to contact with warm syngas. Most of the slag water at the concentrator will be evaporated, and the concentration of dust and salt is enriched in the residual slag water. Then the amount of slag water needs to be discharged significantly.

Part of the condensate from heat exchanger can be drawn out for phenol recovery. Parts of the condensation from the coolers can also be drawn out and undergo further cooling to seed out ammonium bicarbonate. Ammonia recovery can be achieved by precipitating ammonium bicarbonate and separating the solids to form liquid.

The concentrator 4 includes a gas-liquid contact evaporation tube 42, gas-liquid separator 43 and liquid collection barrel 41. The gas-liquid contact evaporation tube is connected with the gas-liquid separator, and the gas-liquid separator is installed in the liquid collection barrel. Syngas enters the gas-liquid contact evaporation tube contacts with the slag water and syngas condensate. Most of water in the liquid will be evaporated by the heat of the warm syngas, and the salinity contained in the evaporated liquid will transfer to the residual liquid, this achieves the purpose of enriching salt concentration. The amount of salt-contained water discharge is reduced due to achieving a high concentration. The discharged high concentration salt-contained water can also be recycle post treatment. It can be returned to the gasifier for high temperature melting/agglomerating for stabilization. Fresh demineralized water can be supplied as makeup water to the ammonia washing tower, the used ammonia washing water is transferred to the scrubber for syngas scrubbing.

It should be noted that the invention is including but not limited to the description above. Any obvious replacements are within the scope of the protection of the invention under the premise that not breaks away from the current invention creation conception.

What is claimed is:

1. A method to reduce the formation of effluent water in coal gasification and syngas pretreatment processes comprising the following steps:
    transferring a high temperature syngas from a gasifier to a cooler for initial cooling to produce a first cooled syngas,
    transferring the first cooled syngas to a dust remover to produce a dedusted syngas,
    transferring the dedusted syngas to a concentrator to produce a concentrated syngas,
    transferring the concentrated syngas from the concentrator to a scrubber to remove impurities to produce a scrubbed syngas,
    heating the scrubbed syngas to a superheated syngas in a heat exchanger,
    transferring the impurities to washing water to produce a salt-containing water,
    transferring said salt-containing water from the scrubber to the concentrator,
    a concentration step within the concentrator comprising:
    contacting the salt-containing water with the dedusted syngas, evaporating a portion of the salt-containing water by the heat from the dedusted syngas to produce a high salt concentration residual water, transferring the high salt concentration residual water out of the concentrator, and mixing the vapor generated by evaporation with said dedusted syngas;
    transferring the superheated syngas out from the heat exchanger to a catalytic shift reactor for water-gas shift reaction,
    transferring the superheated syngas from the catalytic shift reactor to produce a second cooled syngas in a plurality of cooling stages: in a first cooling stage producing a first condensate water and transferring this to the scrubber as the washing water, in a second cooling stage producing a second condensate water and returning the second condensate water to the second cooling stage as cooling water;
    transferring the second cooled syngas to an ammonia washing tower and washing with demineralized water to produce additional washing water,
    transferring the additional washing water to the scrubber for syngas scrubbing,
    transferring the syngas from the ammonia washing tower to a purification system.

2. A method to reduce waste water formation in syngas production according to claim 1, wherein the concentration step further comprises:
    feeding the dedusted syngas and salt-containing water into a gas-liquid evaporation tube set at the inlet of a first gas-liquid separator of the concentrator to produce a syngas and salt containing water mixture,
    transferring the mixture into a second gas-liquid separator installed in a liquid collection barrel, allowing the separated syngas to flow to the scrubber, and collecting the liquid in the liquid collection barrel.

3. A method to reduce waste water formation in syngas production according to claim 2, further comprising:
    transferring a portion of the dedusted syngas from the dust remover to the bottom of the concentrator liquid collection barrel,
    reevaporating the liquid at the bottom of the collection barrel to further increase the concentration of salts in the residual liquid, and then discharging the residual liquid from bottom of the collection barrel.

4. A method to reduce waste water formation in syngas production according to claim 3, wherein the plurality of cooling stages comprises at least three stages of cooling.

5. A method to reduce waste water formation in syngas production according to claim 4 wherein,
    the first cooling stage operates at a temperature of about 95° C.-110° C.,
    the second cooling stage operates at a temperature of about 60° C.-80° C. and,
    a third cooling stage that operates at a temperature of about 25° C.~50° C.;
    and further comprising transferring the second cooled syngas out from the third cooling stage to the ammonia washing tower.

6. A method according to claim 4 wherein the third cooling stage comprises,
    dissolution of the ammonia in syngas into the condensate,
    reaction of the ammonia with carbon dioxide in the syngas and water mixture to form ammonium bicarbonate,
    further cooling to precipitate out ammonium bicarbonate,
    and transferring the residual condensate solution to the said first and third cooling stage for recovery of the remaining ammonia.

7. A method to reduce waste water formation in syngas production according to claim 4, comprising, absorption of large molecular organic molecules from the syngas by mixing diesel with the syngas in the second cooling stage inlet, collecting a mixture of diesel and condensate from second cooling stage, transferring a first portion of the diesel back to the second cooling stage for absorption circulation, transferring a second portion of the diesel to the organic recovery unit for organic recovery, discharging parts of the condensate for phenol recovery, transferring a portion of the condensate to third stage cooler inlet, and transferring the other parts back to the scrubber and gasifier.

8. A method to reduce waste water formation in syngas production according to any of claims 1-7, comprising the following additional steps:

passing the cooled syngas from gasifier through a syngas-condensate-steam-superheater and a syngas-condensate-evaporator and transferring the syngas to the dust remover, transferring part of the syngas condensate generated in the first and second cooling stage to a syngas-condensate-evaporator, transferring a first portion of steam generated in the syngas-condensate-evaporator to gasifier for gasification reaction, transferring a second portion of the steam to a steam superheater, and transferring the syngas stream to the inlet of a catalytic shift reactor.

9. A method to reduce waste water formation in syngas production according to any of claims 1-7, comprising the additional steps:

discharging gasifier slag water from the gasifier to the slag water collecting tank, transferring part of the condensate from the syngas cooling stage to the slag water collecting tank as slag water make-up water, drawing out part of the slag water through a filtering treatment and transferring it to the gas-liquid contact evaporating tube of concentrator to mix with the warm syngas there.

* * * * *